March 23, 1971     M. R. C. BRUHN, JR., ET AL     3,572,152
GEAR SHIFT MECHANISM Filed Feb. 10, 1969                               2 Sheets-Sheet 1

INVENTOR
MAX R. C. BRUHN, JR.
JAMES VANDER JAGT, JR.

BY Price, Heneveld, Huizenga and Cooper

ATTORNEYS

March 23, 1971  M. R. C. BRUHN, JR., ET AL  3,572,152

GEAR SHIFT MECHANISM

Filed Feb. 10, 1969  2 Sheets-Sheet 2

INVENTOR
MAX R.C. BRUHN, JR.
JAMES VANDER JAGT, JR.

BY Price, Heneveld, Huizenga & Cooper

ATTORNEYS

United States Patent Office 3,572,152
Patented Mar. 23, 1971

3,572,152
GEAR SHIFT MECHANISM
Max R. C. Bruhn, Jr., and James Vander Jagt, Jr., Spring Lake, Mich., assignors to Grand Haven Stamped Products, Grand Haven, Mich.
Filed Feb. 10, 1969, Ser. No. 797,860
Int. Cl. F16h 57/06
U.S. Cl. 74—476
8 Claims

ABSTRACT OF THE DISCLOSURE

A gear shifting mechanism having a housing, forward and reverse gear actuating levers pivotably mounted within the housing, and a selector which is mounted within the housing for pivotable movement about two mutually perpendicular axes. A lever engaging means on the selector has arms which extend along the levers and inwardly on either side of the gear actuating levers. The selector is biased away from the reverse gear actuating lever by a cam and a biased cam follower. A second biasing means urges the selector to a position so as to engage the forward lever farthest away from the reverse actuating lever.

This invention relates to gear shift mechanisms. In one of its aspects, it relates to a gear shift mechanism in which a selector within a housing engages forward and reverse actuating levers through a C-shaped gripping element which contacts each lever at the edges thereof.

In another of its aspects, the invention relates to a gear shift mechanism having first and second forward gear actuating levers and a reverse gear actuating lever, a selector within the housing adapted to selectively engage and move each gear actuating lever so as to actuate different gears in a gear assembly, the selector is biased away from engagement with the reverse gear actuating lever by a biasing means including a cam on the selector and a spring-biased cam follower acting against the cam.

One type of manual gear shift mechanism is exemplified by Hurst 3,323,387. In this type of mechanism, a gear shift lever is biased so as to be engageable with higher speed gears, i.e. the third and fourth gears. Reverse gear can be engaged by depressing the shift lever, moving the lever away from the third and fourth gear positions and into the reverse slot. In this kind of gear shifting mechanism, reverse gear is sometimes difficult to engage.

The shift mechanism employs a pin with a selector engaging head which is inserted in slots in a central portion of the gear actuating levers. Slots in the gear actuating levers provide notches at which these levers are subject to breakage.

A second type of gear shift mechanism commonly used does not require depressing of the shift lever in order to engage reverse. The reverse position of the gear shift lever is immediately adjacent the first gear. Engagement of reverse gear in this type of system is not a problem. However, one is never sure whether the reverse or first gear has been engaged by the shift while waiting at a stop light, for example. Inadvertent engagement of reverse in lieu of first gear can be quite surprising for the driver as well as those behind him.

Still another type of gear shift mechanism is illustrated by Merrit 3,088,329. In this shifting mechanism, the shift lever is laterally rockable about a first axis as well as pivotable about a second axis which is perpendicular to and intersects the first axis. Gear actuating levers are positioned on either side of the gear shift lever and are pivotably mounted on the second axis. Each gear actuating lever has an inwardly directed arm above the second axis with a slot with which the shift lever engages the gear actuating levers. This mechanism can only be used to shift four gears, i.e. three forward and one reverse, due to the fact that only two actuating levers can be engaged by the shift lever. This mechanism cannot be used for the popular "four on the floor" type gear shift arrangements.

We have now discovered an improved gear shift mechanism which can be used for the four forward gear type of gear shift and with which inadvertent engagement of reverse is prevented without the necessity of depressing the gear shift lever. Our improved gear shift mechanism employs first and second biasing means for the selector which is fixed to the shift lever, with the second biasing means requiring a much greater degree of force to engage the reverse actuating lever than required to engage the first forward gear actuating lever, for example because of said second biasing means having a biasing force substantially greater than said first biasing means. It has also been discovered that each gear actuating lever can be moved by a C-shaped portion of the selector so that the four forward gears and one reverse gear can be actuated by the selector without slots within the gear actuating levers.

By various aspects of this invention, one or more of the following, or other, objects can be obtained.

It is an object of this invention to provide a gear shift mechanism for a four forward speed gear shifting system in which inadvertent engagement of reverse gear is minimized.

It is a further object of this invention to provide a gear shift mechanism in which gear activating levers are free from weakening slots at the point of engagement with the selector.

It is a further object of this invention to provide a gear shift lever wherein reverse is engaged by a lateral force on the gear shift lever, which force is different in kind than that required to engage the other gears.

Other aspects, objects, and the several advantages of this invention are apparent to one skilled in the art from a study of this disclosure, the drawings, and the appended claims.

According to the invention, there is provided a manual gear shift mechanism including a housing, at least one forward gear actuating lever pivotably mounted within said housing, a reverse gear actuating lever pivotably mounted within the housing, and a selector having means for selectively engaging one of the forward and reverse gear actuating levers. The selector is mounted within the housing for pivoting about a first and second axis with the second axis being substantially perpendicular to the first axis for selectively engaging one of the forward and reverse gear actuating levers and for movement of the lever so engaged into a gear actuating position.

The lever engaging means for the selector has arms which extend laterally of the gear actuating levers and then inwardly so that each gear actuating lever is engaged by the inwardly extending portions of the arms. In other words, the arms form a C-shaped configuration on the selector.

Means are provided within the housing for biasing the selector in a position so as to engage one forward actuating lever. The biasing means comprise first and second biasing means. The first biasing means urges the selector in a position farthest away from the reverse gear. The second biasing means acts against the selector as the selector is moved into a position so as to engage the reverse gear actuating lever. Preferably, the second biasing means comprises a cam on the selector and a cam follower which is spring biased against the cam as the selector moves into a position of engagement with the reverse actuating lever. The second biasing means is much stronger and is a force of a different kind rather than a different degree than that first biasing means.

The invention will now be described with reference to the accompanying drawings in which.

Figure 1:
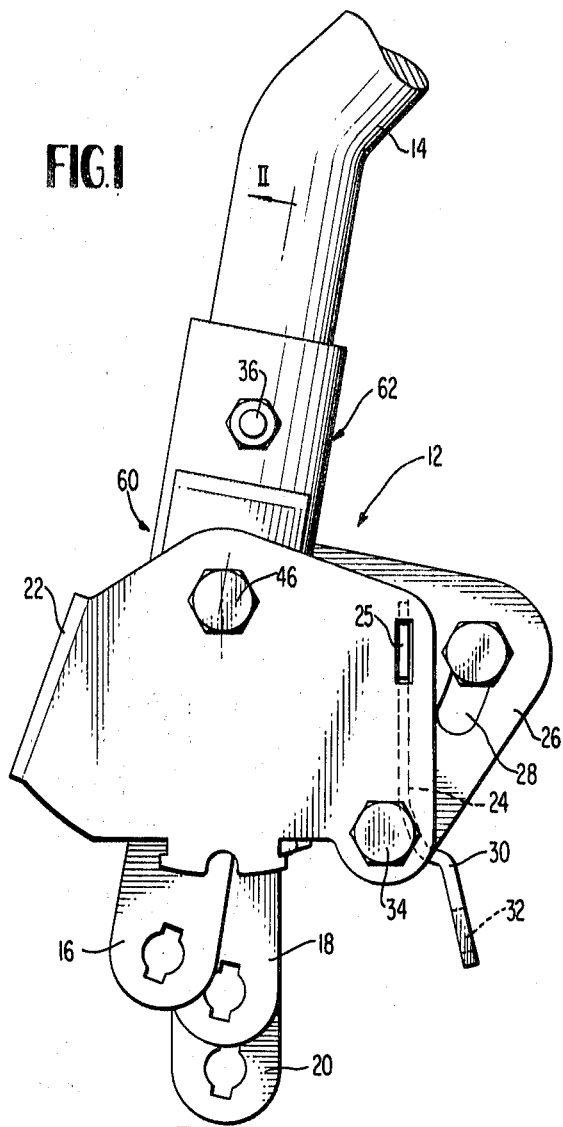
FIG. 1 is a side elevational view of a novel gear shift mechanism according to the invention.

Referring now to the drawings, there is shown a gear shift lever 12 having a handle 14. A third and fourth gear actuating lever 16 extends from the bottom of the mechanism. A first and second gear actuating lever 18 and a reverse gear actuating lever 20 also extend from the bottom of the gear shift mechanism. An outer casing 22, having a switch plate 24 fixed thereto through tabs 25, encloses the gear shift mechanism 12. A flange portion 26 extends out from one side of the casing and has a slot 28 for fixing the mechanism within an automobile, for example as by bolts. A tab 30 having a hole 32 extends from switch plate 24, with which tab 30 the switch plate is fixed within an automobile. A bolt 34 is used to hold the sides of the casing 22 against the switch plate 24 thereby fixing the switch plate within the outer casing. The handle 14 is fixed to a handle portion 62 of a selector 60 by bolt 36 and nut 37.

A bolt 46 extends through the sides of the casing, and is retained thereon by a nut 52. The bolt 46 forms a pivot shaft 48 on which the various parts of the gear shift mechanism are rotatably supported as will be described hereinafter. The pivot shaft 48 has a bushing 50 on which are supported the third and fourth gear lever 16, the first and second gear lever 18, and the reverse gear lever 20.

Figure 2:
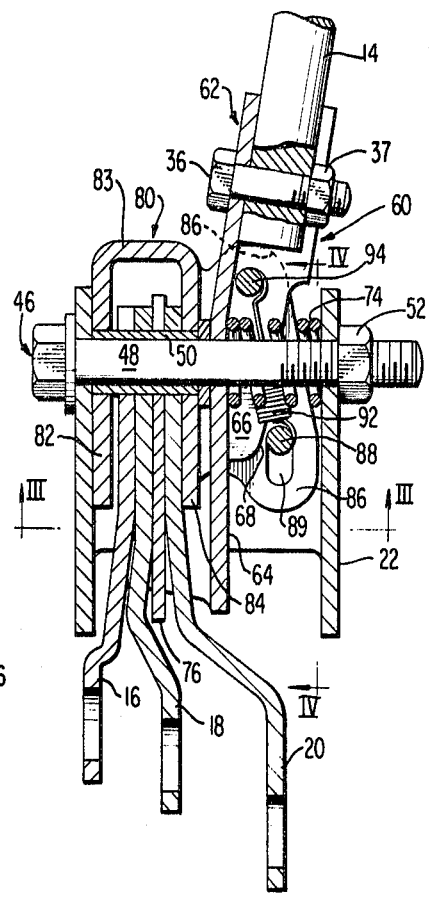
FIG. 2 is a sectional view taken along lines II—II of FIG. 1.
Figure 3:
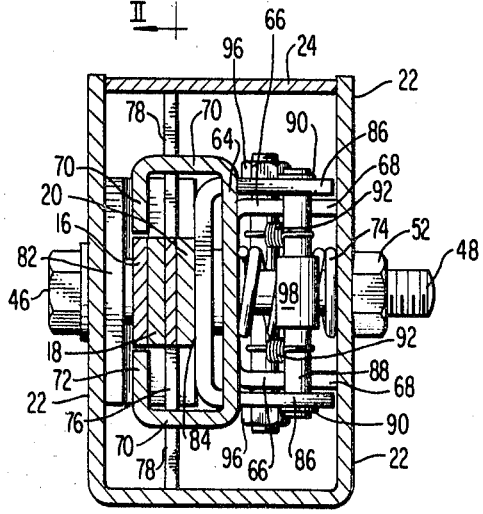
FIG. 3 is a view taken along lines III—III of FIG. 2.
Figure 4:
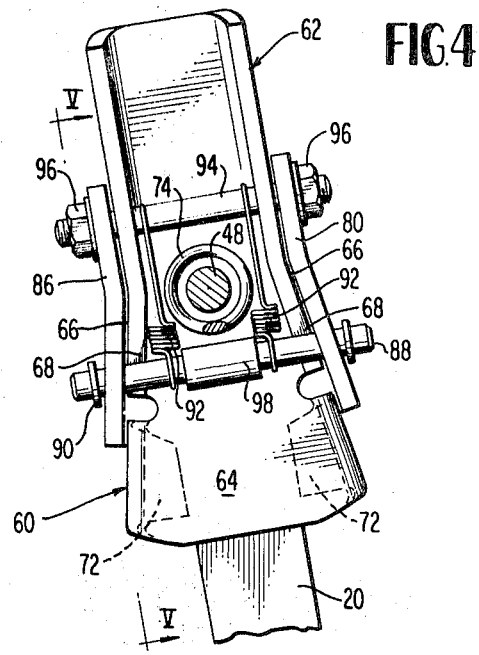
FIG. 4 is a view taken along lines IV—IV of FIG. 2.

The third and fourth gear lever 16 and the selector 60 are shown in a position in which fourth gear would be engaged in FIGS. 1 and 2. In FIGS. 3 and 4, the gear shift levers 16, 18 and 20, and the selector 60 are shown in the neutral position.

The selector 60 has a handle portion 62 which engages the handle 14 as has been hereinbefore described. A flat base portion 64 extends downwardly from the handle portion 62. Cam plates 66 having cam surfaces 68 extend downwardly from the sides of the handle portion and are substantially perpendicular to the flat base portion 64. At the bottom portion of the flat base 64, arms 70 extend laterally away from the cam plates 66 and terminate in inwardly directed, lever engaging fingers 72, as best seen in FIG. 3. The selector is biased in the position shown in FIG. 3 by a spring 74 which abuts at one end against an outer portion of the casing 22, and at the other end against the flat base portion 64.

A shim 76 is fixed on shaft 48. The shim has an upper portion 78 which abuts against the casing 22 at one side and against the switch plate 24 at the other side.

A carrier 80 comprises a first U-shaped portion formed from an outer plate 82 and a central plate 84 connected together through a connecting portion 83. The outer plate 82 and the central plate 84 are journalled on bushing 50 of shaft 48. A second U-shaped portion, perpendicular to the first U-shaped portion, is formed on carrier 80 from the central plate 84 and laterally extending arms 86. In other words, the base of the second U-shaped portion is one side of the first U-shaped portion. The ends of arms 86 terminate adjacent one side of casing 22 so that the carrier 80 is relatively fixed within casing 22 in a right to left direction as viewed in FIGS. 2 and 3. Slots 89 are formed in arms 86 for slidably retaining cam follower shaft 88. Retainers 90 are positioned on the outer portions of the cam follower shaft 88 to maintain the shaft within the slots 89. Springs 92 bias the cam follower shaft into the position shown in FIG. 2. The springs 92 are attached at one end to the cam follower shaft 88 and at the other end to a selector shaft 94.

The selector shaft 94 extends through the handle portion 62 of selector 60 and through arms 86 of carrier 80. Nuts 96 retain the shaft 94 in the position shown in FIG. 4. A rubber insulator 98 is provided on the cam follower shaft 88 to space the springs 92 in the position illustrated in FIGS. 3 and 4 and to eliminate the shock of the flat base portion 64 hitting the cam follower shaft as the selector is moved to the position shown in FIG. 6.

OPERATION

As will be evident from the foregoing description, the selector 60 is pivotable about two mutually perpendicular axes, i.e. about selector shaft 94 and about pivot shaft 48. The carrier 80 as well as the gear levers 16, 18 and 20 can pivot on shaft 48 within casing 22.

The gear shift mechanism is in the neutral and at rest position in FIGS. 3 and 4. In that position, the lever engaging fingers 72 of the selector 60 are adjacent the third and fourth lever 16 by reason of spring 74 forcing the flat base portion 64 of selector 60 to the left relative to casing 22 as viewed in FIG. 2. In order to shift the lever 16 to either third or fourth position, the handle 14 is moved laterally as viewed in FIGS. 1 and 4 so as to permit the selector 60 to rotate about pivot shaft 48. As seen in FIG. 4, the carrier 80 will also rotate about pivot shaft 48 within casing 22 as the selector 60 rotates about shaft 48.

Figure 5:
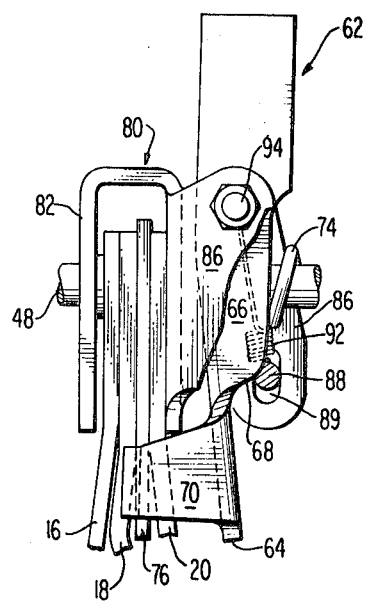
FIG. 5 is a sectional view taken along lines V—V of FIG. 4 showing the position of the selector for engaging the first and second gear levers.

Reference is now made to FIG. 5 which shows the selector in position to engage the first and second lever 18. In order to reach this position, the handle is rotated in a counterclockwise direction about selector shaft 94 against the tension in spring 74. As the selector 60 rotates about shaft 94, the carrier 80 will remain stationary within the casing since the edge of arms 86 are directly adjacent one side of the outer casing 22 (see FIG. 2).

The selector 60 having rotated about selector shaft 94 against the tension of spring 74, the lever engaging fingers 72 will be positioned on either side of the first and the second lever 18. The first and second gears can be engaged by rotating the handle 14 and the handle portion 62 of the selector 60 about the pivot shaft 48. Rotation in one direction will cause first gear to be engaged, and rotation in the other direction will cause second gear to be engaged. In engaging the first or second gear, the carrier 80 will rotate about shaft 48 as the selector 60 rotates about shaft 48.

Figure 6:
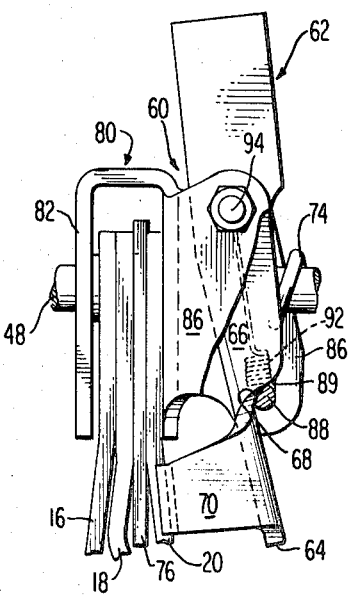
FIG. 6 is a view similar to FIG. 5 showing the selector in the position to engage the reverse gear shift lever.

Reference is now made to FIG. 6 which shows the selector shaft engaging the reverse lever 20. In order to reach this position, the handle 14 must force the handle portion 62 of the selector 60 in a counterclockwise direction about selector shaft 94. In this operation, the cam surface 68 of cam plate 66 will strike the cam follower shaft 88 and push the same downwardly to the bottom of slot 89 against the tension in springs 92. The handle must therefore move against the tension of springs 92 and the tension of spring 74 in order to reach reverse. Once in this position, the handle can then be rotated about pivot shaft 48, thereby also rotating the carrier 80 about shaft 48. During the rotation of the selector 60 and carrier 80 about shaft 48, the shim 76 will remain fixed. Thus, once the reverse gear has been engaged, one of the lever engaging fingers 72 will be forced against the shim 76 to thereby prevent the shift from popping out of reverse due to the tension in springs 92 and spring 74.

Thus, by the gear shift lever according to the invention, a small force is required to position the selector in front of the first and second lever 18 and a much greater force is required to engage the reverse lever 20. By this large differential in force required between reverse and first gears, inadvertent engagement of reverse (instead of first gear) can be avoided.

Reasonable variation and modification are possible within the scope of the foregoing disclosure, the drawings, and the appended claims without departing from the spirit of the invention.

The embodiments of the invention in which an exclusive property or privilege is claimed are defined as follows.

1. In a gear shift mechanism including:
   a housing;
   at least one forward gear actuating lever pivotably mounted within said housing;
   a reverse gear actuating lever pivotably mounted within said housing;
   a selector;
   said selector having means for selectively engaging one of said forward and reverse gear actuating levers;
   means mounting said selector within said housing for pivoting about a first and second axis for selectively engaging one of said forward and reverse gear actuating levers and for movement of said one of said levers thus engaged by said selector into a gear actuating position, said second axis being substantially perpendicular to said first axis;
   the improvement which comprises:
   said lever engaging means of said selector having arms which extend laterally of said gear actuating levers and then inwardly so that each gear actuating lever is engaged by the inwardly extending portions of said arms.

2. A gear shift mechanism including:
   a housing;
   first and second forward gear actuating levers pivotably mounted within said housing;
   a reverse gear actuating lever pivotably mounted within said housing;
   a selector;
   said selector having means for selectively engaging one of said forward and reverse gear actuating levers;
   means mounting said selector within said housing for pivoting about a first and second axis, said second axis being substantially perpendicular to but offset from said first axis for selectively engaging one of said forward and reverse gear actuating levers, and for movement of said one of said levers so engaged by said selector into a gear actuating position;
   means biasing said selector in a position so as to engage one of said first and second forward gear actuating levers;
   the improvement which comprises:
   said biasing means comprising first and second biasing means, said first biasing means biasing said selector in a position for engaging one of said first and second forward gear actuating levers, and said second biasing means biasing said selector so that said selector lever engaging means is biased away from said reverse actuating lever by a force substantially greater than that of said first biasing means whereby inadvertent engagement of said reverse actuating lever instead of a forward actuating lever is minimized.

3. A gear shift mechanism according to claim 2 wherein said second biasing means comprises a spring biased cam follower member, and said selector has a cam surface which contacts said cam follower member for movement of said cam follower member against the tension of said spring as said selector lever engaging means is moved into a position so as to engage said reverse lever.

4. A manual gear shift lever mechanism comprising:
   a housing;
   a pivot shaft carried by said housing;
   first and second forward gear actuating members pivotably mounted within said housing on said pivot shaft;
   a reverse gear actuating member pivotably mounted adjacent said second forward gear actuating member on said pivot shaft;
   a selector pivotably mounted on said pivot shaft;
   handle engaging means on said selector;
   means on said selector for selectively engaging one of said forward and reverse gear actuating members;
   a carrier member within said housing pivotably mounted on said pivot shaft;
   a selector shaft substantially perpendicular to but offset from the axis of said pivot shaft and fixed to said carrier and pivotably mounting said selector shaft on said carrier such that pivotal movement of said selector on said selector shaft causes said selective engagement means to move so as to be engageable with different of said forward and reverse gear actuating members; and
   the improvement which comprises:
   cam means on said selector;
   biased cam follower means on said carrier and positioned for contact with said cam means when said selector pivotably moves about said selector shaft such that when said selective engaging means moves into engaging relationship with respect to said reverse gear actuating member, said cam contacts and moves said cam follower against the bias of said cam follower.

5. A gear shift lever mechanism according to claim 4 wherein a shim is fixed within said housing between said reverse gear actuating member and said second gear actuating member to prevent inadvertent disengagement of reverse after said reverse actuating member has been pivoted about said pivot shaft by said selective engaging means.

6. A gear shift lever mechanism according to claim 4 wherein a second biasing means is provided to bias said selective engaging means toward said first gear actuating member.

7. A gear shift lever mechanism according to claim 4 wherein said lever engaging means of said selector has arms which extend laterally of said gear actuating members and then inwardly so that each gear actuating member is engaged by the inwardly extending portions of said arm.

8. A manual gear shift mechanism comprising:
   a housing;
   a pivot shaft carried by said housing;
   first and second forward gear actuating members pivotably mounted within said housing on said pivot shaft;
   a reverse gear actuating member pivotably mounted adjacent said second forward gear actuating member on said pivot shaft;
   a selector pivotably mounted on said pivot shaft;
   handle engaging means on said selector;
   means on said selector for selectively engaging one of said forward and reverse gear actuating members;
   a carrier member within said housing pivotably mounted on said pivot shaft;
   a selector shaft substantially perpendicular to but offset from the axis of said pivot shaft and fixed to said carrier and pivotably mounting said selector on said carrier such that pivotal movement of said selector on said selector shaft causes said selective engagement means to move so as to be engageable with different of said forward and reverse gear actuating members; and
   the improvement which comprises:
   said selective engaging means on said selector having arms which extend laterally of said gear actuating members and then inwardly so that each gear actuating member is engaged by the inwardly extending portions of said arms.

References Cited

UNITED STATES PATENTS

| | | | |
|---|---|---|---|
| 3,164,030 | 1/1965 | Fodrea et al. | 74—476 |
| 3,306,126 | 2/1967 | Hobbins | 74—473 |

MILTON KAUFMAN, Primary Examiner